United States Patent [19]

Posner et al.

[11] Patent Number: 5,651,887

[45] Date of Patent: *Jul. 29, 1997

[54] FILTRATION SYSTEM AND MOUNT FOR BEVERAGE DISPENSERS AND AUTOMATIC BEVERAGE BREWING MACHINES

[75] Inventors: Mark A. Posner; Al McQueen, both of Los Angeles, Calif.

[73] Assignee: Iraco Filtration Systems, Inc., Inglewood, Calif.

[*] Notice: The term of this patent shall not extend beyond the expiration date of Pat. No. 5,108,598.

[21] Appl. No.: 508,752

[22] Filed: Jul. 28, 1995

Related U.S. Application Data

[63] Continuation of Ser. No. 253,340, Jun. 3, 1994, abandoned, which is a continuation of Ser. No. 82,679, Jun. 25, 1993, Pat. No. 5,342,518, which is a continuation of Ser. No. 819,870, Jan. 13, 1992, abandoned, which is a continuation-in-part of Ser. No. 687,979, Apr. 19, 1992, Pat. No. 5,108, 598, which is a continuation-in-part of Ser. No. 480,025, Feb. 14, 1990, Pat. No. 5,092,999.

[51] Int. Cl.⁶ ................................................ B01D 21/08
[52] U.S. Cl. .......................... 210/232; 210/282; 210/340
[58] Field of Search ................................ 210/232, 341, 210/264, 277, 282, 284, 340

[56] References Cited

U.S. PATENT DOCUMENTS

| D. 240,624 | 7/1976 | MacMurray ........................... D23/3 |
| D. 265,227 | 6/1982 | Jolley ................................... D23/3 |
| D. 274,834 | 7/1984 | May ..................................... D23/3 |
| 2,489,362 | 11/1949 | Bastrup ............................. 210/340 X |
| 2,982,418 | 2/1961 | Balley ................................. 210/448 |
| 3,442,800 | 5/1969 | Jasionowski ........................ 210/57 |
| 3,450,207 | 6/1969 | Hirsch ................................ 166/233 |
| 3,480,148 | 11/1969 | Bryand ............................... 210/380 |
| 3,493,496 | 2/1970 | Bray .................................... 29/13 |
| 3,519,133 | 7/1970 | Broering ............................ 210/232 |
| 3,685,539 | 8/1972 | Warren ............................. 210/341 X |
| 3,696,669 | 10/1972 | Brejcha et al. ........................ 73/168 |
| 3,746,171 | 7/1973 | Thomsen ............................. 210/234 |
| 3,753,495 | 8/1973 | Bjork ................................. 210/206 |
| 3,950,251 | 4/1976 | Hiller ................................ 210/232 |
| 3,951,811 | 4/1976 | Casolo et al. ....................... 210/281 |
| 4,242,201 | 12/1980 | Stephens et al. .................... 210/240 |
| 4,321,139 | 3/1982 | Auclair ............................... 210/232 |
| 4,604,203 | 8/1986 | Kyle .................................. 210/489 |
| 4,609,466 | 9/1986 | McDausland et al. ............... 210/244 |
| 4,690,762 | 9/1987 | Katsura ............................. 210/436 |
| 4,787,976 | 11/1988 | Parham .............................. 210/500 |
| 4,806,243 | 2/1989 | Jackson ............................. 210/303 |
| 4,974,500 | 12/1990 | Boyd et al. ......................... 99/279 |
| 5,035,798 | 7/1991 | Stenger ............................. 210/232 |
| 5,108,598 | 4/1992 | Posner .............................. 210/232 |

FOREIGN PATENT DOCUMENTS 240837  11/1986  German Dem. Rep. ..

OTHER PUBLICATIONS

Ice–O–Matic Brochure, "Water Filtration Systems" Copyright 1988 Crystal Tips Ice Products Brochure Water Filters Rev. Jul. 1988 Everpure OL2–OCS Brochure Copyright 1984.

*Primary Examiner*—W. L. Walker
*Attorney, Agent, or Firm*—Sherman & Sherman; Kenneth L. Sherman, Esq.

[57] ABSTRACT

A filtration system having an in-line filter cartridge with the inlet at one end of the filter cartridge and the outlet at the opposite end of the cartridge. The filter cartridge is connected to the cartridge mounting on the fluid conduits via quick-disconnect couplers with built-in automatic water shutoff capability which enables the filter cartridge to be installed and removed in a horizontal movement. A recirculating bypass is provided in the system which includes a pair of bypass branch lines to recirculate the fluid and prevent trapped stagnant water in the bypass lines. In a shown preferred usage, the filtration system utilizes a filtration cartridge and mount to allow filter cartridges to be easily mounted upon and removed from automatic beverage dispensers.

10 Claims, 8 Drawing Sheets

FILTRATION SYSTEM AND MOUNT FOR BEVERAGE DISPENSERS AND AUTOMATIC BEVERAGE BREWING MACHINES

This is a continuation of application Ser. No. 253,340, filed Jun. 3, 1994, now abandoned which is a continuation of application Ser. No. 082,679, filed Jun. 25, 1993, now U.S. Pat. No. 5,342,518 which is a continuation of application Ser. No. 819,870, filed Jan. 13, 1992, now abandoned which is a continuation-in-part of application Ser. No. 687,979, filed Apr. 19, 1992 and issued Apr. 28, 1992 as U.S. Pat. No. 5,108,598, which is a continuation-in-part of application Ser. No. 480,025, filed on Feb. 14, 1990 and issued Mar. 3, 1992 as U.S. Pat. No. 5,092,999.

FIELD OF THE INVENTION

The present invention relates to fluid treatment systems and, more particularly, to filter systems having disconnectable filter cartridges.

BACKGROUND OF THE INVENTION

In conventional fluid treatment systems, a fluid supply line is interrupted and fluid treatment elements such as filters are inserted into the fluid flow path. When the filtration system is initially installed the fluid flow is shut down, and the entire fluid system is taken out of service. This shutdown is inconvenient and time consuming. Additionally, new filter elements must be installed from time to time when the filter becomes overly contaminated and the effectiveness depreciates below an acceptable level.

Filter cartridges were created to make replacement easy. These cartridge systems sometimes make provision to isolate the fluid treatment system from the fluid utilization system and avoid excessive interruption of the fluid flow when filter elements are changed. For a period of time during which the filters are being changed, unfiltered fluid flows through the system served.

In order to minimize the time and effort required to replace filter cartridges in a filtration system, filters have been provided with quick-connect couplings. Quick connect and disconnect fittings have been employed to permit a single device to be coupled at different locations. This permits the device to be used at several work stations without permanently attaching a device at each outlet.

A filter system which uses quick-connect couplings is shown in Hiller, U.S. Pat. No. 3,950,251. Hiller discloses a horizontal mounting filter cartridge which allows the cartridge to be replaced without any vertical displacement. This ability limits the access space required to replace the cartridges and minimizes the effort required. However, many shortfalls have been recognized in the quick-disconnect couplings shown in Hiller.

The Hiller system uses a single inlet/outlet port at the cartridge's top. This single connection coupling allows an easy mounting with a cost effective mounting coupler. Fluid flows into the Hiller coupler, down a porous plastic tube, through the activated charcoal element and back through the coupler's outlet port.

However, since the amount of filtration effectiveness is directly proportional to the activated charcoal surface area with which the fluid interacts, and the amount of time the fluid remains in contact with the charcoal surface area, the Hiller filter produces an uneven fluid filtration and uneven contact time. The fluid flowing through the charcoal at the bottom of the filter (distant the ports) is cleaner than the fluid flowing through the charcoal at the top of the filter (proximate the ports). Additionally, this cartridge filtration system deteriorates extremely rapidly and wears out unevenly because the charcoal proximate the cartridge ports has a greater fluid flow rate than the charcoal distant the ports.

The Hiller cartridge single adaptation port also uses the water pressure itself to flow past the activated charcoal and against gravity to retain the outlet port.

Furthermore, the Hiller cartridge system is unstable. By using the Hiller coupler system in order to allow cartridge filter installation, the filter is limited to a single anchoring placement. Any jarring of the filter places the entire jarring force on the single anchoring at the coupler ports, making the filter extremely susceptible to cracking and leaking.

A further disconnectable filter cartridge system is the "bayonet mount" filter cartridge shown in U.S. Pat. No. 3,442,800 to Jasionowski, U.S. Pat. No. 3,696,669 to Brejcha et al., and U.S. Pat. No. 3,746,171 to Thomsen. Here a cylindrical filter cartridge is vertically received vertically into a cylindrical mounting collar which engages the filter cartridge through a rotational action. These "bayonet mount" systems require large access space, since the cartridges must first engage the collar and then be rotatably fastened. This is a two-handed operation requiring space for consumer maneuverability.

Additionally, these bayonet mounts suffer many of the same shortcomings as discussed above with respect to Hiller, U.S. Pat. No. 3,950,251. The bayonet mount uses a single connection coupling point, having minimal stability, both in attachment and during removal. When attached to a thin wall, the increased stress during connection may crack or dislodge the coupling from the wall. Furthermore, the "bayonet mount" system is not a through-flow treatment system, in line with the plumbed source. The mounts therefore adversely affect filter life and effectiveness.

In conventional filter systems the fluid flow bypass can also lead to problems. Usually the replacement period is a relatively short interval and need not be the source of any major problems. However, most bypass systems include a first valve or set of valves which exclude fluid from the bypass line and direct all of the fluid through the treatment device. A second valve or set of valves switches fluid supply to the utilization system alternatively from the bypass line or the treatment device.

Depending upon the size of the bypass, a finite volume of fluid can be trapped within the bypass line during filtration. Over the long period of time between changes of treatment elements, such as filter cartridges, such fluid trapped in the bypass can stagnate, permit the growth of bacteria, and absorb foreign materials from the piping itself.

Most installations ignore this contaminated fluid. This may be acceptable in large systems where the usage of fluid is so great that the incremental volume of stagnant water poses little or no threat to the integrity of the system, but it is never desirable. The contaminated fluid becomes a substantial problem in special purpose treatment systems such as water filtration systems of the type used in beverage dispensing systems, ice makers, vending machines, and other installations where the quality of even small quantities of fluid is important or where health and safety considerations are involved.

In industrial beverage dispensing systems further problems arise because fluid taste is usually enhanced by fluid flavor enhancers such as sweeteners, syrups and coffees. Although this process leads to a desirable fluid mixture for drinking and tasting purposes, the process also camouflages the taste of contaminants in the water.

One example of such a fluid dispenser is an automatic beverage brewing machine such as an automatic drip, coffee, or tea machine. In automatic drip coffee machines regular, untreated tap water flows into the coffee machine, is heated, is dripped through a disposable coffee filter holding coffee and flows into a pot for serving. These types of automatic machines are distinguishable from "pour over" water brewers where the consumer pours water directly into the brewer. These machines are connected directly into the household water source. At no time is the water treated for contaminants which are further camouflaged when the water is made into coffee.

This failure to treat the water prior to serving is especially problematic in industrial serving environments, i.e., restaurants, where the beverage dispenser is continuously in demand and the restauranteur cannot afford to discontinue using the dispenser while a fluid treatment system is serviced. These problems are also applicable in other beverage dispensing machines such as cola mixers, ice makers, etc.

OBJECTS OF THE INVENTION

It is therefore an object of the invention to provide a filter system having a horizontal motion quick-disconnect coupling providing greater stability when mounted.

It is yet a further object of the invention to provide a horizontal motion quick-disconnect filter system using a cartridge which deteriorates evenly, provides evenly clean fluid, and has a longer usage life.

It is yet a still further object of the present invention to provide a horizontal motion quick-disconnect filter wherein the fluid interacts with the activated charcoal which uses the water pressure in combination with gravity to retain the outlet port.

It is yet even a still further object of the present invention to provide a filtration system which minimizes the amount of contaminated fluid allowed to stagnate within a filter bypass.

It is yet even a still further object of the present invention to provide filtration systems and mounts for beverage dispensers and coffee machines, where the filter cartridges are easy and quick in replacement.

SUMMARY OF THE INVENTION

These and other objects of the invention are provided by a through flow, fluid filtration cartridge system. By placing cartridge couplings at opposing ends of a cartridge, fluid flows evenly through the activated charcoal elements within the cartridge maintaining a uniform contact time, and anchoring support is provided by both the inlet and outlet couplings. The filter cartridges may be oriented in a particular plane such that the filter can be installed and removed with motion substantially perpendicular to that plane through the multiple quick-disconnect couplings located at opposing ends of the cartridge.

Although the use of multiple quick-disconnect couplings, one for each port, requires the insertion of multiple coupling adapters, the benefits which are achieved in filter life and filtration quality, case of installation and removal and increased stability far outweigh any problems accrued. Furthermore, by providing opposing port filter cartridges, the filtration capacity of the system can be easily increased by parallel stacking the filter cartridges as more demand is created.

A further aspect of the invention includes a recirculating system for a bypass so that stagnant fluid is not retained in the bypass when not in use. Stagnant water in the bypass loop is averted through a recirculation loop which continuously recirculates the fluid in the bypass line.

A still further aspect of the invention provides a filtration system and mounts for industrial and consumer beverage dispensing systems where tap water is used for consumer enjoyment. In a beverage dispenser filtration cartridge system made in accordance with this aspect of the invention, a beverage dispenser which accepts tap water directly from the line source at an input and provides enhanced beverage-styled water for consumption at an output has a detachable filter cartridge connectable to the dispenser fluid path as discussed above. In the preferred embodiments of this aspect of the invention, the beverage dispenser is an automatic beverage brewing machine such as an automatic drip coffee or tea machine.

The preferred embodiments allow for both integral and external filter mounts. In integral mounts first and second conduits are routed within an external wall of the dispenser and the cartridge is externally placed on the wall. In an external filter mount system a mount is first fastened to the external wall of the dispenser and then the filter cartridge is connected to the mount externally of the wall and conducts fluid flow along an external fluid path having fluid access leading into the dispenser.

BRIEF DESCRIPTION OF THE DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

The following description is provided to enable any person skilled in the art to make and use the invention and sets forth the best modes contemplated by the inventor of carrying out the invention. Various modifications, however, will remain readily apparent to those skilled in the art, since the generic principles of the present invention have been defined herein.

Figure 1:
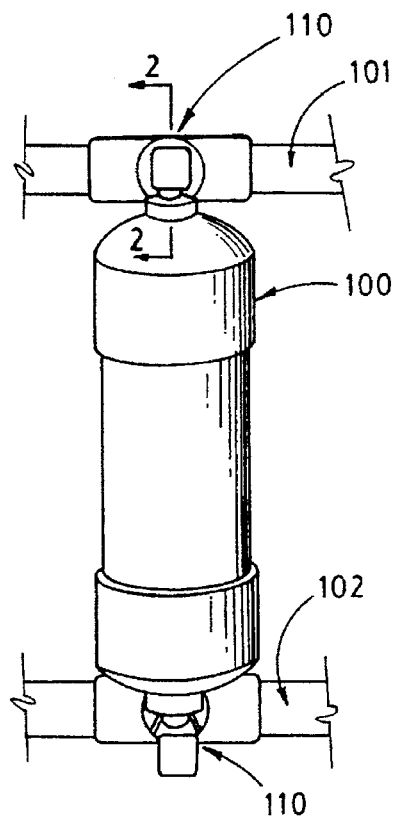
FIG. 1 is a rear view illustration of a filter cartridge as used in the preferred embodiment of the present invention.
Figure 7:
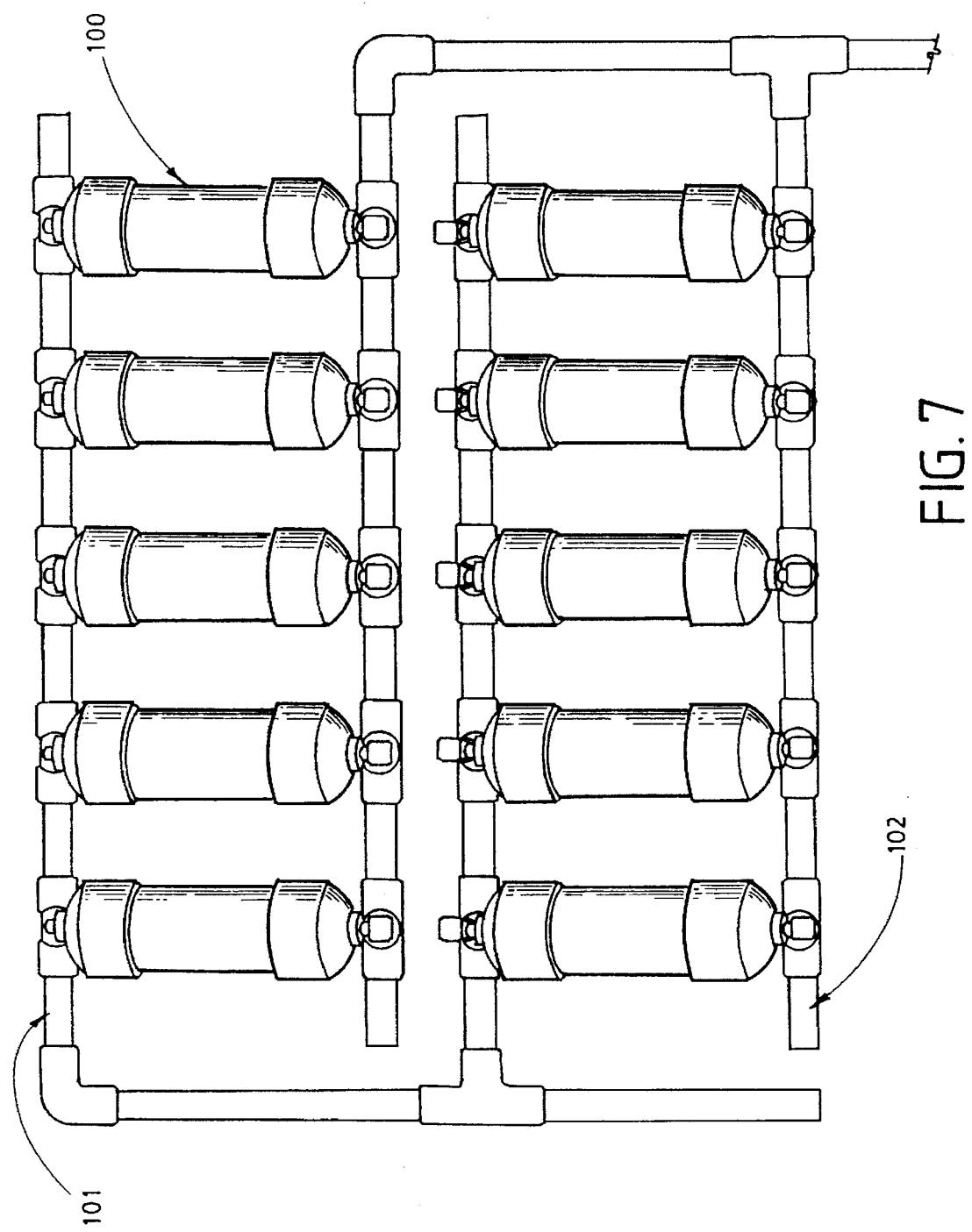
FIG. 7 is a diagram showing the stacking capabilities of the filter element described in FIG. 1.

FIG. 1 illustrates a preferred embodiment of the horizontal motion quick-disconnect filter system of the present invention. The filter cartridge 100 is detachably mounted between an inlet fluid conduit 101 and an outlet fluid conduit 102. In this embodiment, fluid is forced to flow out of the inlet fluid conduit 101 through the filter cartridge 100 and into the outlet fluid conduit 102. As shown in FIG. 7, in the preferred embodiment, the fluid conduits 101, 102 are not connected, and the only way fluid is able to pass between the fluid conduits 101, 102 is to travel through the filter cartridges 100.

The filter cartridge 100 is connected to the fluid conduits 101, 102 by male/female quick-disconnect couplers 110. In the preferred embodiment the couplers 110 are symmetrically identical. Other designs are envisioned however which include "keyed couplers." In the keyed coupler design of the alternative embodiment, the inlet outlet couplers have different diameters forcing mandatory filling of the cartridge in a single input/output configuration.

Figure 2:
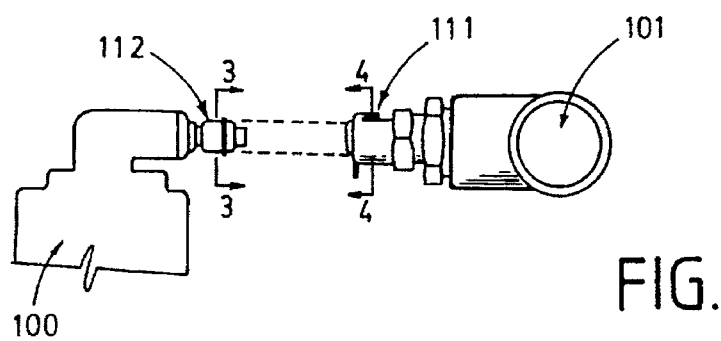
FIG. 2 is a cross-sectional illustration of the male/female coupling elements utilized in the filter cartridge illustrated in FIG. 1.

As shown in FIG. 2, the female coupler 111 is plumbed into the inlet fluid conduit 101. For the sake of simplicity, only the inlet conduit coupling is explained in detail. However, the outlet fluid coupler is symmetrically identical and may be easily understood herefrom.

FIG. 2–4 and 6 illustrate the male/female coupling elements used in the preferred embodiment of the invention. The coupling elements used in the preferred embodiment are available from Caulder Products Company, Minneapolis, Minn. In the preferred embodiment, these couplings are utilized for their quick-disconnect characteristics and for their ability to provide an automatic seal upon removal. As shown in FIG. 2, the male fitting 112 attached to the filter cartridge 100 fits directly into the female fitting 111 attached to the fluid conduit 101.

Figure 3:
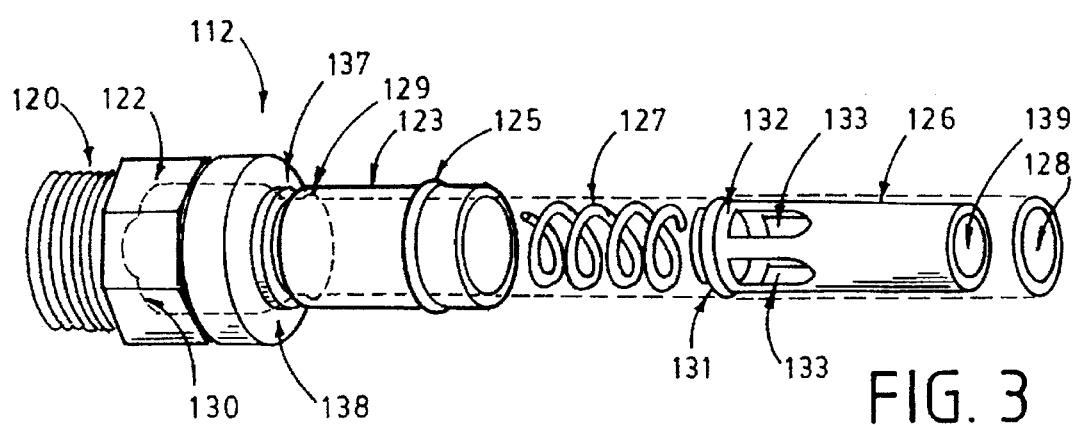
FIG. 3 is an exploded cross-sectional view of the female coupling element illustrated in FIG. 3.

An exploded illustration of the male fitting 112 is shown in FIG. 3. Screw threading 120 allows the male fitting 112 to be screw threadably mounted into the filter element at mounting point 121 (shown in FIG. 6). The hexagonal nut fastener 122 allows the male fitting to be screwed into the mounting element 121. The nozzle 123 fits within the female nozzle receptacle 124 (shown in FIG. 4). The O-ring 125 on the nozzle 123 frictionally engages the inside wall of the female receptacle 124 to prevent fluid leakage.

The male valve projection 126 fits inside the nozzle 123 and is springably biased by spring 127 into an extended position. An O-ring 128 surrounds the projection 126 and fits inside O-ring notch 129.

When biased into its natural position, nozzle 126 closes fluid access into the filter cartridge 100. Spring 127 is outwardly biased between inside engagement wall 130 and projection base 131. Projection 126 is thereby forced into its outermost position, and O-ring 128 is caused to frictionally engage the projection just above the O-ring base 131 at point 132. Since the projection is solid at O-ring base 131 and is only open at openings 133, fluid cannot flow past O-ring 128, and no fluid interaction is allowed.

Figure 4:
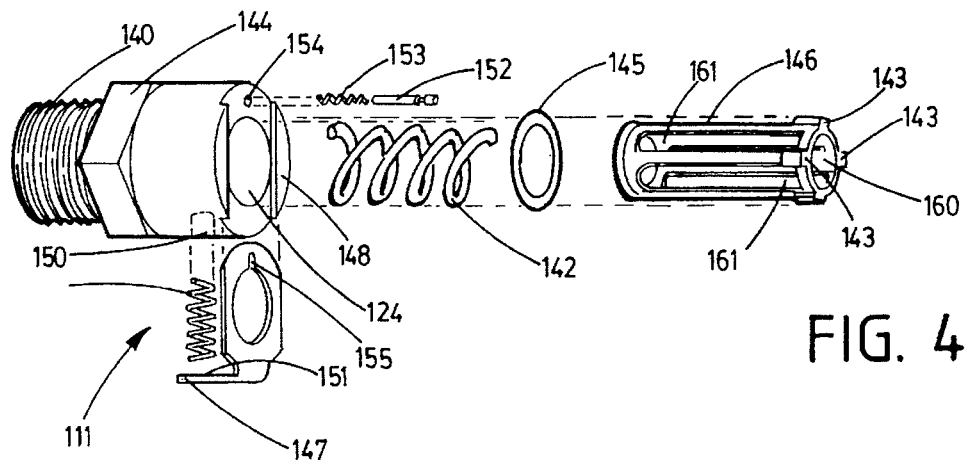
FIG. 4 is an exploded cross-sectional view of the female coupling element illustrated in FIG. 3.

The female coupling element 111 is shown in exploded form in FIG. 4. The screw threading element 140 allows the female coupling element 111 to be screw threadably mounted upon a plumbing conduit. A nozzle 141 is springably biased in the outermost position by spring 142. Spring 142 fits between spring receiving notches 143 and spring retaining wall 144.

An O-ring 145 fits around projection 146 to frictionally engage the inside wall of female receptacle 124 and thereby provide fluid seal.

A locking mechanism 147 is slidably mounted upon the female coupling element 111 between mounting ridges 148. The locking element 147 is springably biased into the upwardmost position by spring 149, which fits between spring ridge 150 and touch handle 151.

A locking bar 152 is springably biased by spring 153 inside spring hole 154. The locking bar fits through notch 155 on locking element 147.

As in the male coupling element 112, the female coupling element 111 is biased into the closed position so that fluid cannot flow unless the male coupling element is inserted. When the male coupling element 112 is inserted into the female coupling element 111 at female receptacle opening 124, the male projection 126 is forcibly pushed by female projection 146 against bias spring 127 and into an open position. In this position, fluid may flow into first nozzle opening 139 through nozzle openings 133 and into the filter cartridge 100.

Likewise, female nozzle projection 146 is pushed into its open position by the male projection 126, and fluid will flow through the female projection openings 160, 161 and to or from the fluid conduit 101, 102. When the projection 123 is fit into the female receptacle opening 124, the locking bar 152 engages the opposing locking bar wall 138, and the locking mechanism 147 is forced to springably engage the male projection ridge 137, thereby locking the male and female couplings together.

Through this coupling structure, fluid is allowed to flow between the fluid conduits 101, 102 and the filter cartridge 100. When the cartridge is locked into place and the male/female receptacles are coupled, fluid will flow. When the locking element 147 is pressed into the release mode and the cartridge is pullably removed from engagement, the male/female projection valves 126, 147, respectively, will bias into the closed position and fluid flow will be automatically shut off.

Figure 5:
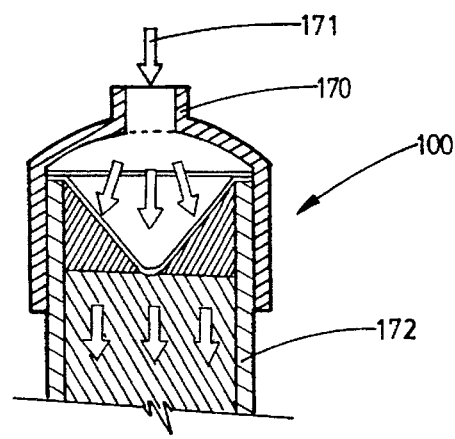
FIG. 5 is a cross-sectional view of the filter cartridge depicted in FIG. 1.
Figure 6:
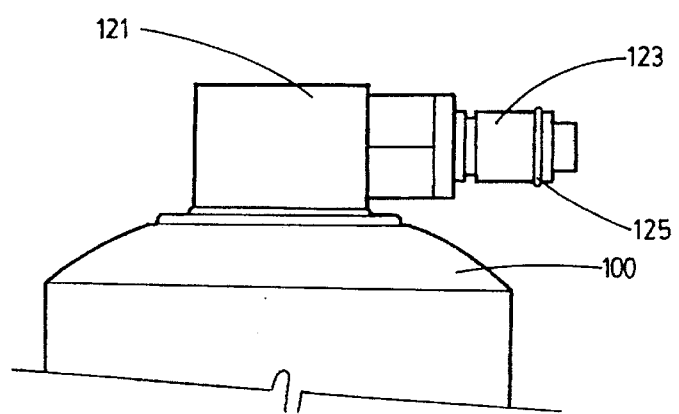
FIG. 6 is a magnified side view illustration of the male coupling element attached to the filter cartridge depicted in FIG. 1.

A cross-sectional illustration of the filter cartridge utilized in the preferred embodiment of the invention is shown in FIG. 5. Water is allowed to flow from the inlet conduit 101 (shown in FIG. 1) through the male/female couplers 112, 111, respectively (shown in FIG. 2) and into the inlet port 170 of the filter 100. The fluid 171 (shown by arrows in FIG. 5) is evenly disbursed by a conical stage filter, so that the fluid may evenly interact with the activated charcoal elements 172. At the outlet port 174, the fluid flows through a second conical filter 173, through the outlet portion 174, and into the outlet fluid conduit 102, to be recirculated into the fluid system (not shown).

As shown in FIGS. 1–6, the filter cartridge of the preferred embodiment of the invention is horizontally coupled to the fluid conduits by couples or connections 110 at opposing points on the fluid cartridge 100. Anchoring support is thereby provided at both ends of the filter cartridge 100, and the fluid is evenly disbursed and evenly interacts with the activated charcoal element 172.

Furthermore, the preferred embodiment of the invention allows the filter to be in-line oriented in any particular plane such that the filter can be removed and installed with only a single motion perpendicular to that plane of installation. The specific horizontal motion disconnection of the preferred embodiment described herein is a single trajectory running along common parallel radii of the fluid conduits 101, 102 perpendicular to the axial flow of the respective fluid conduits 101, 102. The filter cartridge 100 is easily mountable and detachable with the quick-disconnect couplings in this direction as described. Although the preferred embodiment illustrates a top-down fluid flow from input to output, any fluid flow using a filter cartridge having couplings as defined by the claims are also within the scope of the present invention.

Furthermore, by providing the filtration coupling cartridges of the preferred embodiment of the present invention, filtration capacity can be increased without limitation by the filter system. FIG. 7 illustrates a stacking technique enabled by the filtration cartridges of the preferred embodiment of the present invention. As shown, the filtration cartridges 100 fit between the input fluid conduit 101 and the output fluid conduits 102. The filtration cartridges 100 are stacked in parallel to increase the filtration capacity of the system. Any filtration cartridge 100 may be removed while fluid flow and filtration may be continued through other filtration cartridges left in place.

The quick-disconnect automatic shutoff couplings as described above allow each filter cartridge to be easily removed without shutting down the fluid flow through the entire input fluid conduit 101 and output fluid conduit 102. A further system for accomplishing the same function would be to include shutoff valves installed behind the female filter couplings 111 plumbed into the conduits 101, 102. In this way, the filter cartridges may be simply stacked in parallel as needed for increased filtration capacity demand.

Figure 8:
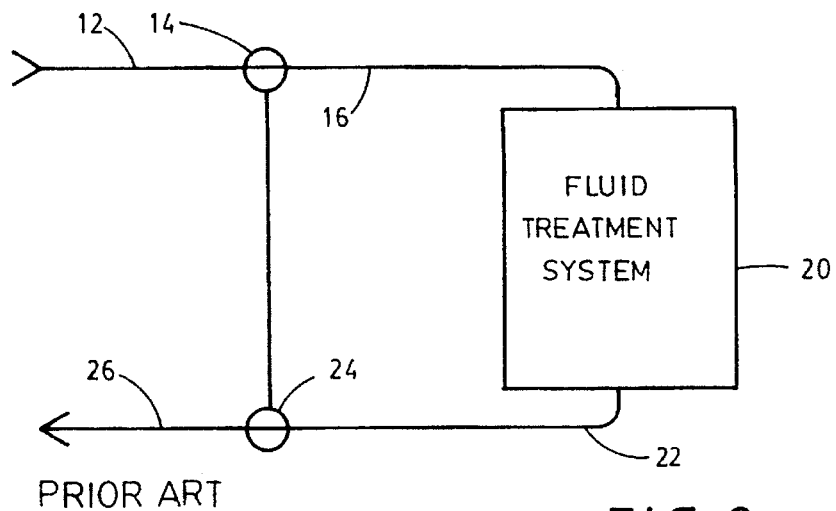
FIG. 8 is a block diagram of a prior art bypass system.

Turning now to FIG. 8, there is shown a diagram of a prior art filtration bypass system 10. As shown, a main inlet line 12 is coupled to a first bypass valve 14 which alternatively connects the main line 12 to either the treatment input line 16 or the bypass branch 18.

During normal operation, the fluid flows through the main inlet line 12, through the first valve 14 into the treatment line 16 and through the fluid treatment system 20. The output of the treatment system 20 is applied to a fluid return line 22 and through a second bypass valve 24 into the main output line 26 which supplies fluid to utilization devices, such as ice makers, beverage dispensers, or the like. The second bypass valve 24 alternatively connects the main output line 26 to the fluid return line 22 or the bypass branch 18 and is normally set to direct flow from the treatment system 20 to the main output line.

When the conventional fluid treatment system 20 must be serviced or otherwise disconnected, the first and second bypass valves 14, 24 are switched to direct flow through the bypass branch. When the servicing or other activities are completed, the first and second bypass valves 14, 24 are returned to their normal states, thereby leaving fluid trapped in the bypass branch 18.

It is this fluid, trapped within bypass branch 18, that can stagnate and become contaminated with bacteria or with materials that can be leached or dissolved from the walls of the bypass branch 18. Even if there is no contamination, when fluid stands for long periods of time, its quality, clarity, or flavor may be adversely affected.

Figure 9:
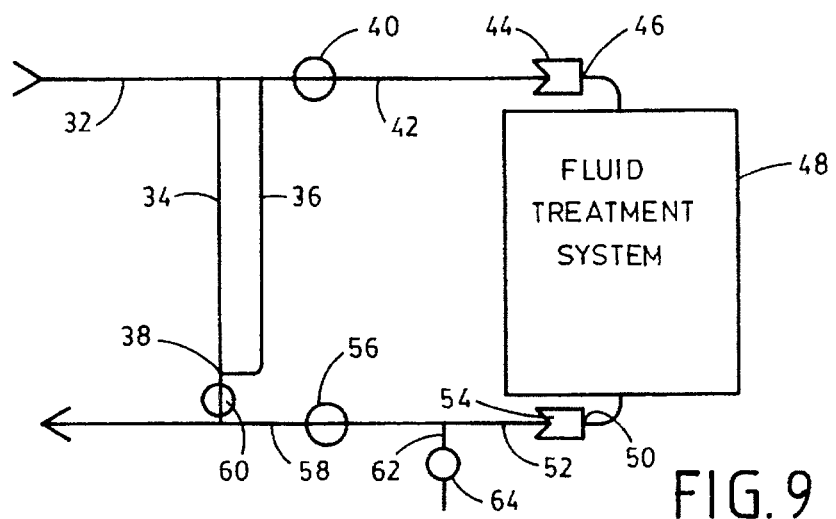
FIG. 9 is a block diagram of a recirculating bypass system according to a preferred embodiment of the present invention.

As shown in FIG. 9, the system of the preferred embodiment prevents the retention of stagnant fluid in the bypass branch over long periods of time. A main bypass valve is inserted in the main line between a fluid treatment device and a recirculating branch which includes parallel branch lines that are joined by a "y" coupling to the main line that serves the fluid utilization devices. A second valve between the "y" and the main line is opened during periods of bypass flow.

A third valve controls the output of the treatment device to the line leading to the fluid utilization devices. A purging or flushing line may be included in the treatment device output before the third valve and may include its own flush valve so that new treatment cartridges can be purged or flushed before being put into service.

In the structure of the preferred embodiment shown in FIG. 9, a main inlet 32 is connected to a first and second bypass branch lines 34, 36. At their other ends, the branch lines 34, 36 connect together in a Siamese or "y" connection 38. Alternatively, the connection could be mechanized with a "t" section as shown in the figure, but the term "y" connection will be used hereinafter and should be considered as encompassing such other mechanizations.

The main inlet 34 continues beyond the bypass branch lines 34, 36 and is connected to a first bypass valve 40. The first bypass valve 40 is coupled to the treatment input line 42 which terminates in a quick-disconnect coupler 44, as discussed above, that mates with a quick-disconnect fitting 46 on the input of the fluid treatment system 48.

A similar setup is provided on the output side of the fluid treatment system. A quick-disconnect fitting 50 connects the treatment system output to a fluid return line 52 which includes a second quick-disconnect coupler 54. An output control valve 56 connects the fluid return line 52 with the main output line 58. The "y" connection 38 joins the main output line 58 through a bypass control valve 60.

A purge or flush line 62 may be connected to the fluid return line 52 through a purge valve 64. This enables a user to check the treatments system for impurities or contaminants which can be flushed out before placing the system on line.

During normal operation with the treatment device in place, the primary fluid flow path is through the main bypass valve and into the input side of the treatment device, which may be a filter cartridge. The output of the filter cartridge flows through the third valve into the main fluid supply line.

When the second bypass valve is closed, a recirculating flow takes place through the bypass branches. That is, as the incoming fluid passes over the first branch of the bypass line which, when utilized, would normally divert fluid into the main line from the treatment device, fluid is drawn into the passing flow from the branch. As the fluid passes the other end of the bypass loop, the reduced pressure in the loop that results from the aspiration of fluid into the passing flow causes a diversion of some of the fluid into the loop.

The main volume of fluid, however, continues into the treatment device and is passed through the device before being returned into the main flow line leading to the fluid utilization devices. The flow through the bypass loop need neither be great nor rapid as the fluid in the loop continues to circulate and is not trapped to stagnate.

In operation with the fluid treatment system in use, the fluid flow in the main inlet line 32 sets up a circulating flow through the branch lines 34, 36 through the "y" coupling 38.

When the fluid treatment system 48 is to be serviced or replaced, the quick-disconnect couplers 44, 54 release the quick-disconnect fittings 46, 56 and the couplers 44, 54 block any further fluid flow. If the system does not include quick-disconnect connectors, and to prevent any leakage in the disconnecting process, the bypass control valve 60 should be opened and the first bypass valve 40 and the output control valve 56 should be closed.

Once the bypass control valve 60 is opened, the relatively high resistance to fluid flow of the fluid treatment system 48 will cause most of the fluid to flow through the bypass branches 34, 36. Closing the bypass valve 40 and output control valve 56 directs all of the flow through the bypass branches 34, 36.

Any fluid in the bypass branches at the time the bypass control valve 60 is opened will be relatively fresh and will have no adverse impact upon the fluid utilization devices downstream. This flow pattern will be maintained until the fluid treatment system 48 is to be again utilized in the system. Using the quick-disconnect couplers 44, 54 and fittings 46, 56, the fluid treatment system 48 can be quickly returned for further use.

Frequently, it is necessary to flush or purge the fluid treatment system 48 prior to placing it on line. For that purpose, the first bypass valve 40 is opened and the purge valve 64 is also opened. If the flow through the fluid treatment system 48 is insufficient for the purge operation, the bypass control valve 60 can be utilized to balance the impedance in the flow paths so that a greater portion of the flow can be diverted to the fluid treatment system 48.

When the fluid treatment system 48 is ready to be returned to full service, the purge valve 64 is closed and the output control valve 56 is opened. The bypass control valve 60 can then be closed and recirculation resumes in the first and second branches 34, 36.

Figure 10:
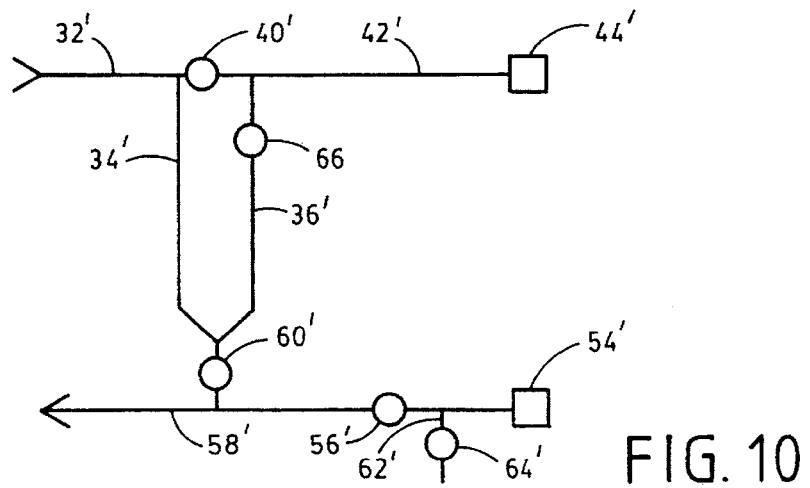
FIG. 10 is a block diagram of an alternative recirculating bypass system according to a second preferred embodiment of the present invention.

An alternative embodiment of the bypass recirculating system according this aspect of to the present invention is shown in FIG. 10. In this embodiment, the first bypass valve 40' is located between the first and second branches 34', 36' of the bypass. Further, a second bypass control valve 66 is interposed in the second branch 36'.

As in the system of FIG. 9, quick-disconnect couplers 44', 54' are provided to enable easy connection to a fluid treatment system (not shown). A purge line 62' and purge valve 64' can also be included in the system.

The principal difference between this system and the system of FIG. 9 is the placement of the first bypass valve between the branches of the bypass. Closing the first bypass valve 40' then includes only the first branch 34' in the fluid flow path and requires the closure of the second bypass control valve 66 to prevent a "sneak" path of fluid to the treatment input line. This is important in the absence of fittings which cut off fluid flow, such as the quick-disconnect units that are employed in the preferred embodiments.

Figure 11:
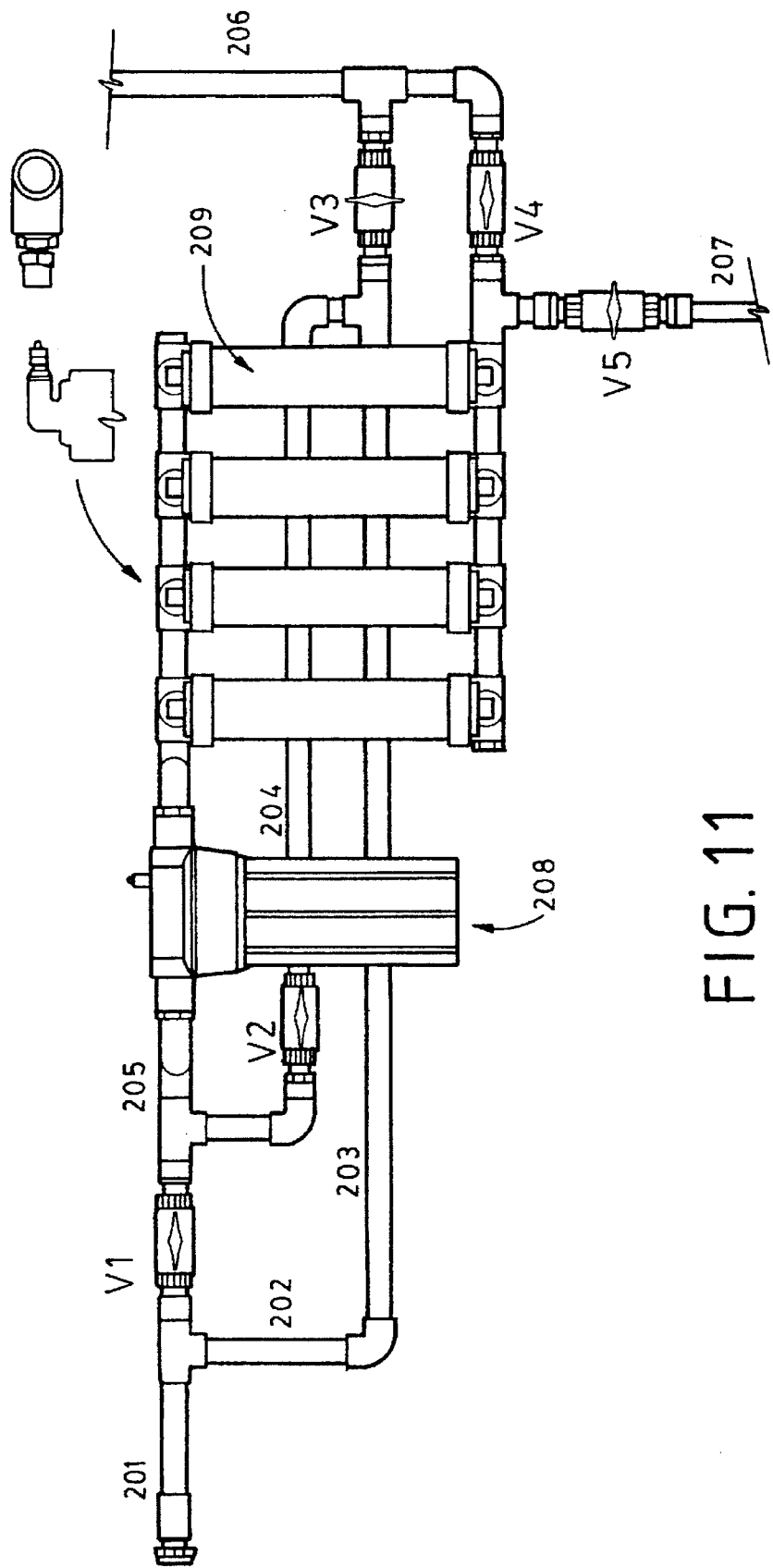
FIG. 11 is a structural illustration of the diagrammed embodiment of FIG. 10.

FIG. 11 is a structural illustration of the embodiment diagramed in FIG. 10. In FIG. 11, conduit 201 is equivalent to line 32', conduit 202 and 203 are equivalent to line 34', conduit 205 is equivalent to line 42', conduit 204 is equivalent to line 36', conduit 206 is equivalent to line 58', valve V1 is equivalent to valve 40', valve V2 is equivalent to valve 66', valve V3 is equivalent to valve 60', valve V4 is equivalent to valve 56', and valve V5 is equivalent to valve 64'. Additionally, the filter elements 209 shown in FIG. 11, fit between couplings 44', 54', shown in FIG. 10, and refilter 208 is placed in series along conduit 205 before the parallel filters 209. The conduits 204, 203 flow behind the refilter 208 and filter cartridges 209.

As can be seen in FIG. 11, the recirculating bypass which includes conduits 202, 203 and 204 prevent the stagnation of water in the bypass during cartridge filtration. Furthermore, by closing valve V4 and leaving valves V1, V2, V3 and V5 open, the system simultaneously flushes carbon particles out of the newly installed filter cartridges 209 and into a flush output conduit 7 while continuing filtration bypass through valve V3. In this way, newly installed filter cartridges may be flushed while the fluid utilization system may be kept on line instead of being shut down. In many systems a water flow shut down would require the entire system to be shut down, whereas the bypass system of the present invention allows the filtration system to be shut down while the fluid utilization system may be retained on line.

Figure 12:
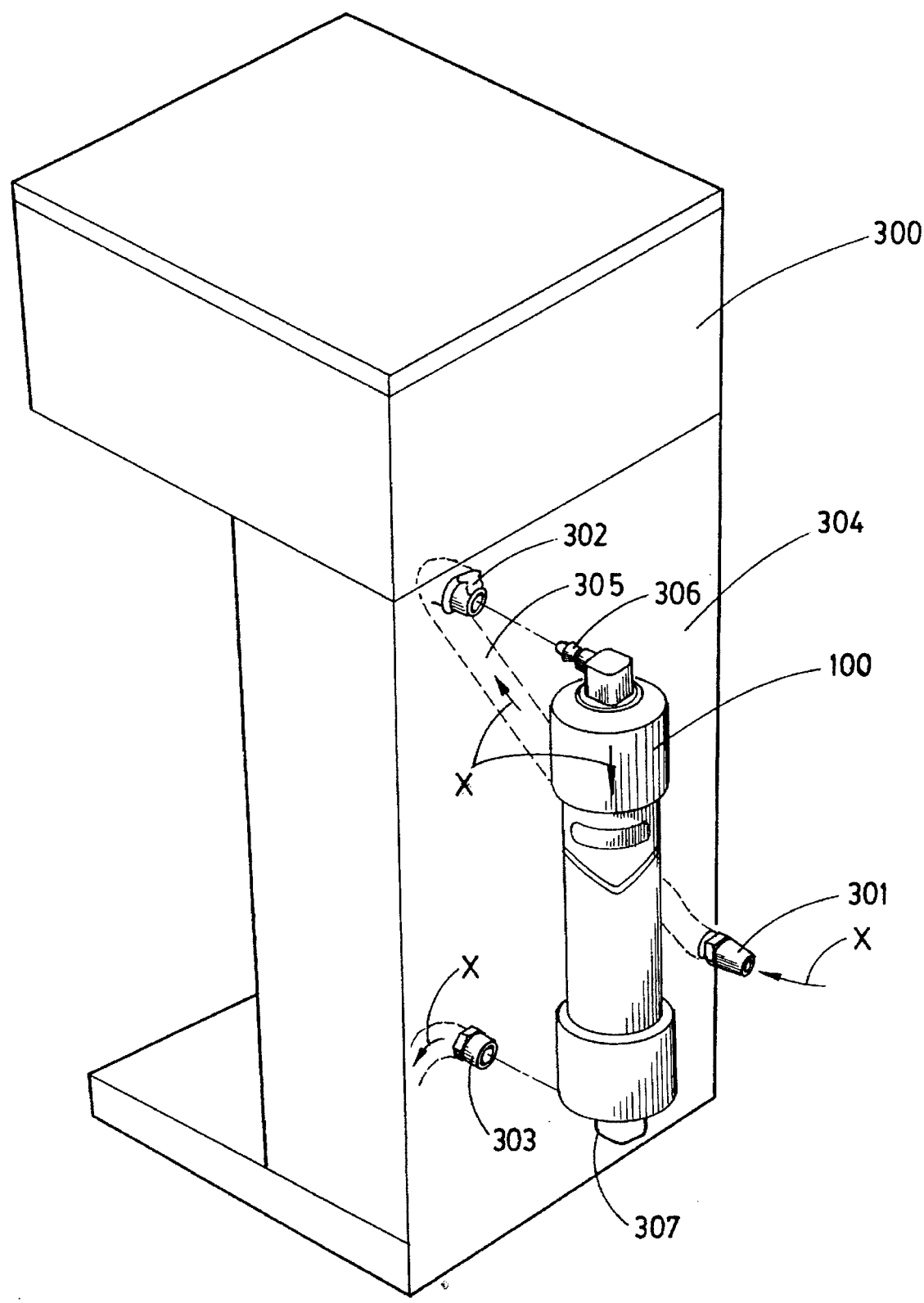
FIG. 12 is an illustration of a preferred embodiment of an integral beverage dispenser filtration system and mount utilized in one aspect of the present invention.

FIG. 12 illustrates a preferred embodiment of the invention wherein the fluid filtration cartridge system is applied to beverage dispensers such as automatic drip coffee machines. In FIG. 12, a coffee machine 300 accepts tap water from an external water source (not shown) through an input fluid connection 301.

This type of in-line automatic beverage brewing machine is distinguishable from a "pour over" automatic brewer where the consumer pours the water into the brewer. In in-line automatic brewers the brewer is connected directly to the line source and the line pressure is able to speedily force the water through the filter cartridge. The flow of the water through the system and filter cartridge 100 is indicated by arrows X.

As shown in FIG. 12, two female couplings 302, 303 respectively, are installed within external wall 304 of beverage dispenser 300. It should be noted that the external wall 304 of these beverage dispensers is commonly constructed from a malleable stainless steel material. Thus, a multiple connection filter cartridge provides stability of attachment, while a single connection filter cartridge is increasingly susceptible to being broken during mounting. This is especially the case in bayonet mounts where the cartridge is twisted during placement.

The couplings 302, 303 are displaced at a distance along rear external wall 304 sufficient to allow replaceable interaction with symmetrically displaced male couplings 306, 307 of the filter cartridge 100.

As discussed above with respect to FIGS. 1-11, the couplings 302, 303 are quick-disconnect couplers which allow easy replacement and automatic shut off when the filter 100 is being replaced or serviced. Furthermore, the placement of the couplers 302, 303 allow the filter to be mounted and replaced in a single horizontal motion as is also discussed above.

As shown in FIG. 12, tap water flows into the input fluid connection 301 and up transference fluid conduit 305 in the direction X. The fluid flows out of female quick-disconnect coupler 302 and into male inlet fluid coupling 306. The water flows down through filtration cartridge 100 for cleaning and treating, out of the filters male outlet fluid coupling 307 through female quick-disconnect output coupler 303 and into the beverage dispenser for use. In this manner, the present invention is able to provide an easy quick-disconnect filtration system in automatic beverage dispensers.

Figure 13:
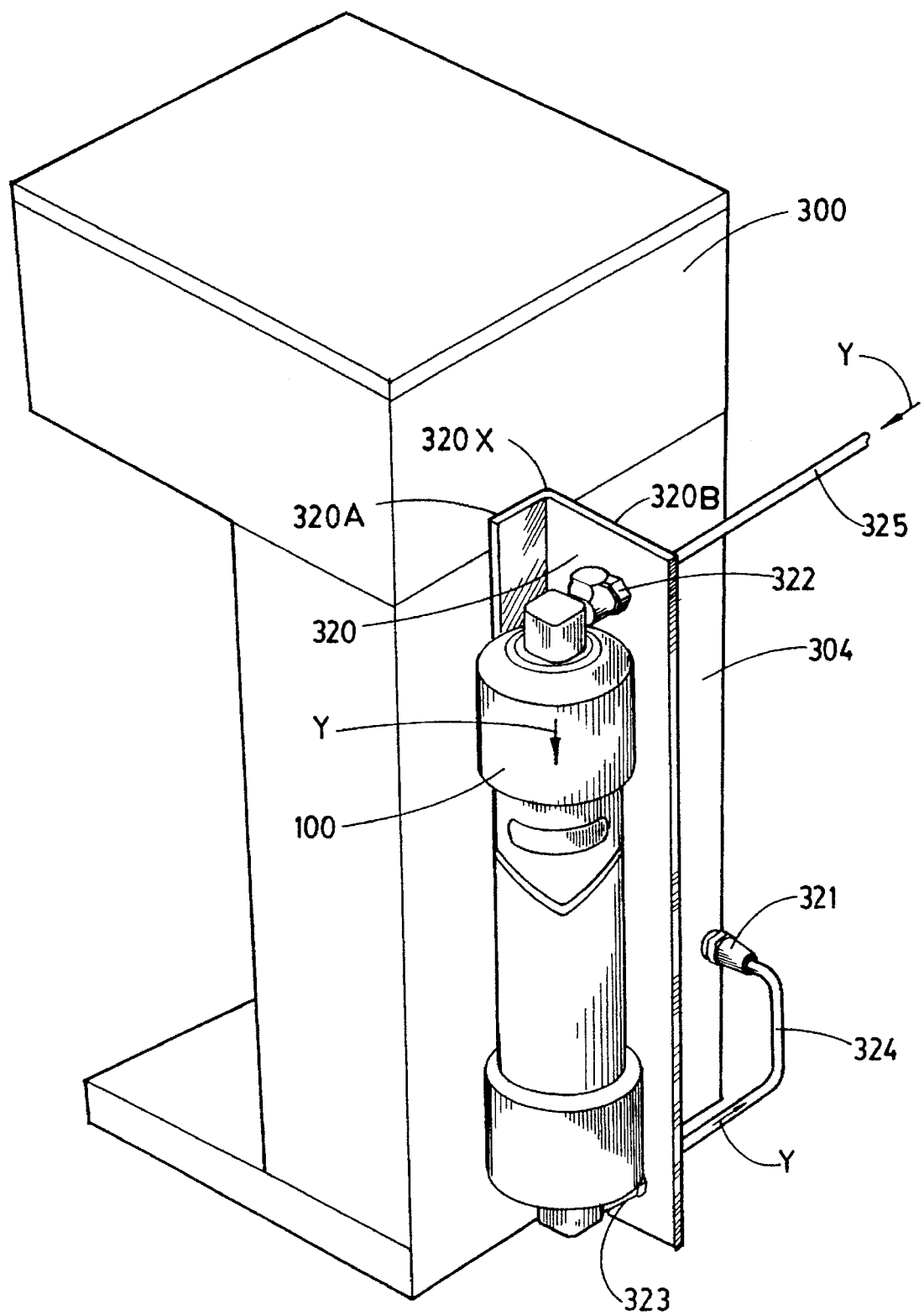
FIG. 13 is an illustration of a preferred embodiment of an external beverage dispenser filtration system used in conjunction with preexisting automatic beverage dispensers.

FIG. 13 shows a further automatic fluid dispenser cartridge filtration system. The system shown in FIG. 13 provides a filtration mount for preexisting beverage dispensers which have not been manufactured for filtration cartridge usage.

As shown in FIG. 13, a filtration mount 320 is fastened to the rear surface 304 of coffee machine 300 using suitable mounting mechanisms (not shown) such as screws or welds. In the preferred embodiment, the filtration mount 320 is an elongated, stainless steel flat with a ninety 90-degree bend 320x running along the filtration mount's elongated axis.

The 90-degree bend 320x divides the filtration mount into two areas 320a and 320b. Area 320a provides a fastening mount so that the filtration mount 320 may be securely fastened to the rear surface 304 of coffee machine 300. The second portion, 320b, is provided within filtration mount 320 to accept female quick-disconnect couplers 322 and 323.

A first external fluid conduit 324 provides fluid flow access between female quick-disconnect coupler 323 and preexisting input fluid connection 321. A second external fluid conduit 325 provides fluid flow access between female quick-disconnect coupler 322 and an external water source (not shown).

As shown in FIG. 13, water flows in the direction Y. The water flows from an external water source (not shown) through second external fluid conduit 325 into water filter 100 out through first external fluid conduit 324 and into the beverage dispenser 300 through preexisting input fluid connection 321.

As discussed above, filtration mount portion 320b has fastened thereto quick-disconnect couplings 322 and 323 which have all the attributes discussed above with respect to FIGS. 1–12. These quick-disconnect couplings 322, 323 are placed at a sufficient distance along filtration mount portion 320b to allow filter cartridge 100 to be quick-disconnect coupled and removed. Furthermore, the couplings 322, 323 allow the filtration cartridge to be moved in a substantially horizontal motion as also discussed above.

Figure 14:
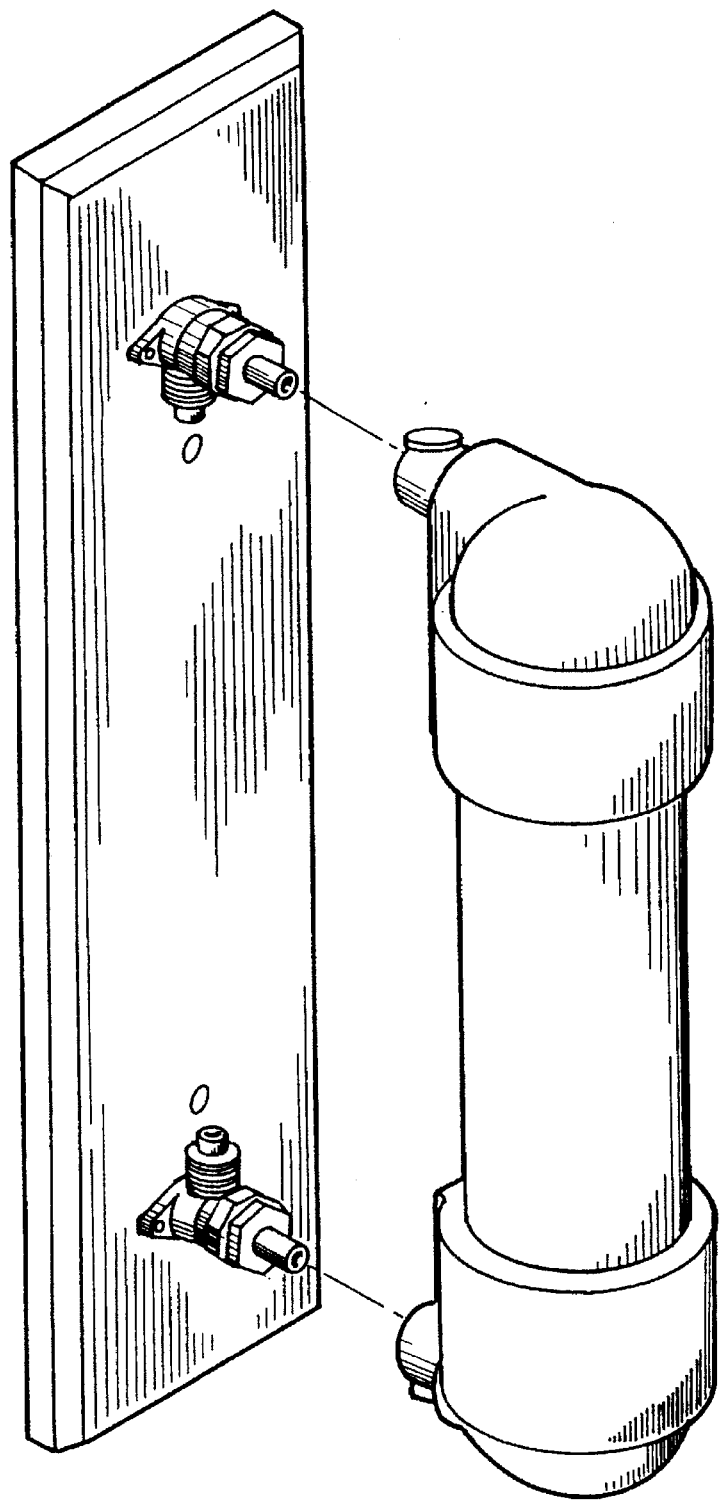
FIG. 14 is an illustration of a stabilized filtration cartridge having a rounded in-head mount with male/female disconnect couplings released from the embodiment shown in FIG. 1.

Those skilled in the art will appreciate that various adaptations and modifications of the just-described preferred embodiments can be configured without departing from the scope and spirit of the invention. It should be noted, for instance, that the male/female configuration of the quick-disconnect couplings 111 and 112; 302, 303, and 306, 307; and 322, 323 may be reversed in actual use to increase the stability and life of the couplings. This is shown in the embodiment of FIG. 14. Therefore, it is to be understood that, within the scope of the appended claims, the invention may be practiced other than as specifically described herein.

What is claimed is:

1. A fluid treatment cartridge system, comprising: a cartridge for through flow treatment of fluid, the cartridge having an inlet fluid coupling at one end of the cartridge and an outlet fluid coupling at an opposite end of the cartridge, the inlet and outlet couplings providing detachable fluid access to separate fluid conduits of a fluid utilization system, wherein the cartridge's in-line orientation is in a plane of installation such that the cartridge can be installed and removed with motion substantially perpendicular to the plane of installation.

2. The cartridge system of claim 1, wherein the inlet and outlet couplings are quick-disconnect couplers.

3. The cartridge system of claim 1, wherein the couplers have a built-in automatic fluid shutoff.

4. The cartridge system of claim 1, wherein the fluid passing the inlet fluid coupling is evenly disbursed throughout the cartridge's cross-sectional area for through flow treatment.

5. The cartridge system of claim 1, wherein the cartridge provides the only fluid access between the separate fluid conduits.

6. The cartridge system of claim 1, wherein the inlet and outlet fluid couplings are symmetrically identical.

7. The cartridge system of claim 1, wherein the couplings are keyed couplers.

8. The cartridge system of claim 1, wherein the cartridge may be removed without eliminating fluid flow in the separate fluid conduits.

9. The cartridge system of claim 1, wherein a plurality of cartridges may be installed in parallel to increase the fluid treatment capacity and speed.

10. The cartridge system of claim 9, wherein the cartridges may be separately removed and replaced without eliminating through flow fluid treatment.

* * * * *